Jan. 29, 1952 W. C. EHLERT ET AL 2,584,000
SUNSHADE AND OTHER AUXILIARY SPECTACLES
Filed July 28, 1948

INVENTOR.
WILLIAM C. EHLERT
BY FRANK J. SCHNEIDER, JR.

Alfred C. Body

ATTORNEY

Patented Jan. 29, 1952

2,584,000

UNITED STATES PATENT OFFICE 2,584,000

SUNSHADE AND OTHER AUXILIARY SPECTACLES

William C. Ehlert, Warrensville Heights, and Frank J. Schneider, Jr., Pepper Pike Village, Ohio, assignors to Domar Products, Inc., Cleveland, Ohio, a corporation of Ohio Application July 28, 1948, Serial No. 41,004

1 Claim. (Cl. 88—41)

This invention pertains to the art of optical eye glasses and more particularly pertains to optical glasses adapted to be fastened and supported on a pair of ordinary spectacles either for the purpose of adjusting the degree of refraction of the ordinary spectacles or for the purpose of restricting the amount of light passing therethrough. The invention is particularly adaptable to sun glasses of the clip-on type.

The principal object of this invention is the provision of a new and improved pair of eye glasses of a type adapted to be fitted over and supported on a pair of ordinary spectacles, which glasses are extremely light in weight, formed of a minimum number of component parts, each of which parts is simply and economically manufactured, is easily and readily assembled and which will provide constant and dependable usage over extended periods of time.

Another object of the invention is the provision of a new and improved pair of auxiliary glasses having a pivoted spring-biased clip disposed over the bridge thereof for supporting and retaining same on a pair of ordinary spectacles, the shaft on which the clip is pivoted being directly fixed to the bridge of the glasses in a simple and readily assembled manner.

Another object of the invention is the provision of a new and improved pair of auxiliary glasses of the one-piece plastic type and having a plastic bridge, the glasses being adapted to be supported on a pair of ordinary spectacles by means of a clip articulated relative to the bridge and suitably biased, the clip being articulated on a shaft, which shaft is retained in position by having portions firmly imbedded in the bridge.

Other and more specific objects of this invention will appear upon a reading of the specification taken in conjunction with the attached drawing, wherein a preferred embodiment of the invention is shown and in which.

Figure 1:
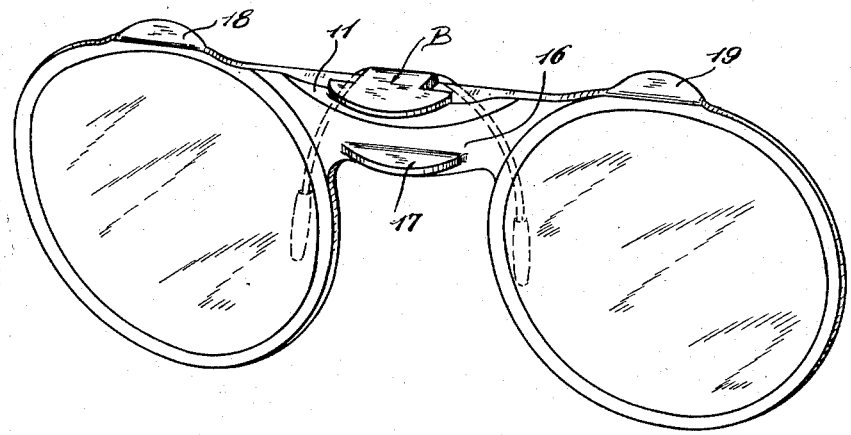
Fig. 1 is a front perspective view of a pair of auxiliary glasses embodying the present invention.

Referring now to the drawings, Fig. 1 shows a pair of auxiliary glasses designated generally at A, embodying the present invention, adapted to be mounted on a pair of ordinary spectacles, having the usual pair of spaced lenses and an interconnecting bridge structure. The auxiliary glasses shown comprise generally a pair of lenses 14, 15 of any desired optical property joined by an interconnecting bridge 16 and a clip B articulately supported on the bridge. The pair of lenses 14, 15 and the bridge 16 are shown as formed of one integral piece and preferably of a light-weight thermoplastic material, of any desired optical transparency or color. The lenses 14, 15 and the bridge 16 may be formed in the one integral piece by injecting molding or the like, using the process and mold structure as is more clearly and fully described in our co-pending application for Letters Patent, Serial No. 708,966, filed November 9, 1946, now Patent No. 2,516,373, issued July 25, 1950.

The bridge 16 in the embodiment shown is provided with a forwardly extended tab 17 adjacent its lower edge, the function of which will become apparent hereinafter. The upper edge of the bridge 16 is thickened, as at 11, for increasing the transverse strength of the bridge and also providing a means for mounting the clip B, as will be explained hereinafter.

The top of each lens 14, 15 has a transversely and rearwardly extending lug or ear 18, 19, respectively, which are adapted to extend over and rest upon the upper edge of the frames of the spectacles. The function of the lugs 18, 19 is to position the auxiliary glasses vertically relative to these spectacles.

For the purpose of retaining the auxiliary glasses on the spectacles, a clip shown generally at A is provided which is disposed generally midway of and fastened to the bridge 16 in a manner as will be presently described. As shown, the clip has a pair of diverging arms or tines 20, 21 which extend slightly to the rear and then downwardly in a gradual curve a substantial distance, where they are adapted to engage the inner or rear surfaces of the spectacle lenses at a point which is outwardly from the edge of the lenses which would normally be disposed adjacent the sides of the wearer's nose. The clip A is articulated relative to the bridge and is biased in such a manner that the tines 20, 21 are urged forwardly to engage the rear surfaces of the spectacle lenses and thereby draw the auxiliary glasses into firm engagement with the front surface thereof. As shown, the ends of the tines may be provided with soft, bead-like tips 22, 23. These tips may be formed from a plastic material having a plasticizer therein for the purposes of keeping the material from ever finally hardening over a period of time. The clip A extends forwardly of the bridge 16 to form a finger piece 24 by which the tines 22, 23 may be moved against the force of a biasing spring 25 out of engagement with the spectacle lenses, so that the glasses may be easily removed from or installed on such spectacles.

Figure 2:
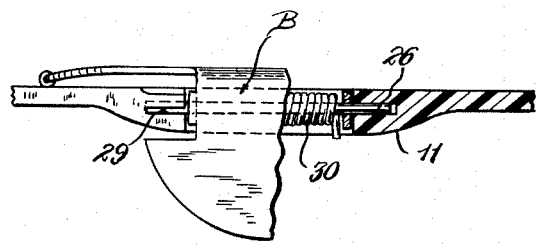
Fig. 2 is a fragmentary top elevational view of the glasses shown in Fig. 1, with portions thereof broken away to show the structure with greater clarity.
Figure 3:
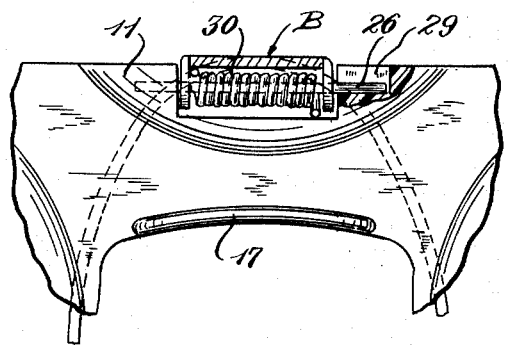
Fig. 3 is an enlarged front elevational view of the glasses shown in Fig. 1, with portions thereof broken away.
Figure 5:
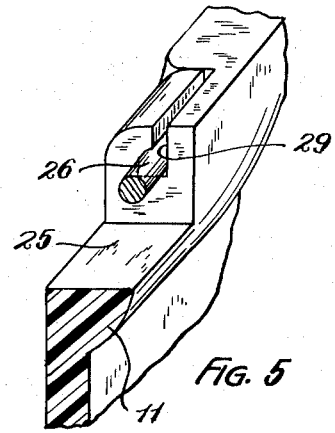
Fig. 5 is a view similar to Fig. 4, showing the shaft on which the clip is permanently imbedded in the bridge of the glasses.

The present invention contemplates a new and improved construction for supporting the clip A relative to the bridge 16 of the auxiliary glasses. As shown more clearly in Figures 2 and 3, the bridge has a short, centrally disposed transverse recess 25 in its upper edge, having a base wall 27 and end walls 27, 28. A shaft 26 of a length somewhat longer than the length of the recess 25 extends across the length of the recess 25 parallel to and spaced from the base wall 27, with its ends extending into the bridge beyond the end walls 27, 28, where they are imbedded in the upper edge of the bridge 16. The clip A, at the point where it is disposed over the bridge 16, has a pair of integral, spaced, downwardly extending ears or lugs 28, 29, which lugs adjacent their lower end have aligned openings therethrough, through which the shaft 26 passes and thus supports the clip A in articulated relationship, relative to the bridge 16 and the glasses. The lugs are preferably spaced slightly less than the spacing of the side walls 27, 28 and thus position the clip longitudinally of the bridge. A helical coil spring 30, having as many turns as is deemed necessary, is disposed around the shaft 26 between the ears 28, 29. One end of the spring extends tangentially a distance sufficient to overlap the side of the bridge 16. Similarly the opposite end of the spring extends tangentially a sufficient amount to engage a side of the clip. The entire spring, when the clip and shaft are assembled on the bridge 16 is distorted or flexed to a desired degree such as to constantly urge the tines 20, 21 in a forward direction, while at the same time enabling the tines to be moved in a backward direction when it is desired to place the glasses on a pair of spectacles.

Figure 4:
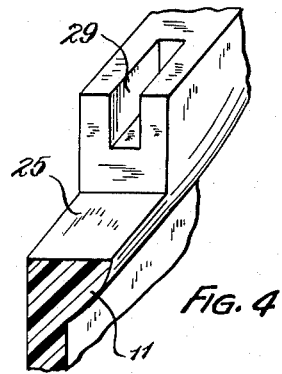
Fig. 4 is a fragmentary perspective view of the bridge of the glasses before the clip mechanism has been installed thereon.

The shaft 26 may have its ends imbedded in the material of the bridge at either end of the recess 25 in any desired manner. For example, the clip, shaft 26 and spring 30 may be assembled and suitably positioned in the plastic mold for making the glasses, the mold then closed, and the glasses formed with the plastic flowing around either end of shaft 26. Alternatively, and preferably, the lenses 14, 15 and the bridge 16, are injection molded as an integral unit. Fig. 4 shows a fragmentary sectional view of the bridge structure in the as-molded condition. As shown, the recess 25 is formed during the molding operation, together with a slot 29 in the upper edge of the bridge and extending longitudinally for a short distance from each side of the recess 25. As shown, the depth of the slot 29 is somewhat less than the depth of the recess 25. Preferably, the length and width of the slot 29 are just such as to receive the shaft 26. This is clearly shown in Fig. 3.

To assemble the glasses as shown, the shaft 26 and spring 30 are assembled with the spring 30 positioned between the ears 28, 29 and the shaft passing through the openings in the ears and through the axial opening of the spring 30. This assembly is dropped into the recess 25 with the ends of the shaft 26 being positioned in the slots 29. The glasses are then placed in a suitable fixture, having surfaces against which the front or outer side of the bridge 16 may bear. Subsequently, a heated iron, having a length approximately the same as the length of the slot 29, is brought into engagement with the upper back edge of the bridge opposite the slot 29. If the material of the bridge is a thermoplastic material, it will be seen that the upper back edge of the bridge will be permanently deformed over the upper surface of the shaft 26, thereby permanently fixing the shaft 26, together with its clip A and spring 30, into the operative position. It is preferred that only the back upper edge of the bridge be heated. In this way, when the glasses are assembled on a pair of spectacles, the distortion or heat flow lines due to the heating of this upper edge is not apparent to the casual observer.

Thus it is seen that there has been described a pair of auxiliary glasses adapted to be readily attached and detached from a pair of ordinary spectacles, which glasses are simple and inexpensive to manufacture, light in weight, comprising a minimum of easily and readily manufactured component parts which are easily assembled into the finished article.

While, by way of illustration and example, this invention has been described in connection with preferred embodiments thereof, as to structure and use, it will be obvious to those skilled in the art after understanding the foregoing that various changes and modifications may be made without departing from the spirit or scope of of the invention and it is the intention to cover all such modifications and changes insofar as they come within the scope of the appended claim.

Having thus described our invention, we claim:

A pair of auxiliary glasses adapted to be supported upon a pair of ordinary spectacles, said glasses comprising a pair of lenses interconnected at their opposing upper portions by a relatively thin, substantially straight, generally horizontal plastic bridge, a recess extending downwardly from the upper edge of said bridge to define opposing side walls and a bottom, the portion of the bridge surrounding said recess being of relatively thickened cross-section, a horizontal shaft extending across said recess and into slotted portions of the opposing side walls thereof, said shaft having a substantial portion of its ends embedded in the thickened portion of said bridge by closing the top edges of the slots so as to fixedly support the shaft in said opposing side walls, a spring biased clip assembly rotatably mounted on said shaft, said assembly including a clip, a coiled spring mounted on said shaft with a portion bearing on said clip and a portion bearing on the bottom of said recess for holding the clip in closed position, and a pair of downwardly extending mounting ears on said clip provided with mounting openings through which said shaft passes, said ears being spaced apart a distance substantially equal to the length of the recess to position each ear adjacent a wall of the recess whereby the clip is held against axial movement along said shaft.

WILLIAM C. EHLERT.
FRANK J. SCHNEIDER, Jr.

REFERENCES CITED

The following references are of record in the file of this patent:

UNITED STATES PATENTS

| Number | Name | Date |
| --- | --- | --- |
| 1,614,827 | Coats | Jan. 18, 1927 |
| 1,730,799 | Bowes | Oct. 8, 1929 |
| 2,217,475 | Goehring | Oct. 8, 1940 |
| 2,266,593 | Emmons | Dec. 16, 1941 |
| 2,408,273 | Sager | Sept. 24, 1946 |
| 2,414,757 | Mitby et al. | Jan. 21, 1947 |